(12) United States Patent
Johnson

(10) Patent No.: US 6,709,138 B1
(45) Date of Patent: Mar. 23, 2004

(54) TIRE WITH FLUORESCENT TREAD AND TREAD WEAR INDICATORS

(76) Inventor: Vernell Johnson, 1021 W. Norwood St., Realto, CA (US) 92377

( * ) Notice: Subject to any disclaimer, the term of this patent is extended or adjusted under 35 U.S.C. 154(b) by 53 days.

(21) Appl. No.: 10/039,533

(22) Filed: Nov. 1, 2001

Related U.S. Application Data

(60) Provisional application No. 60/165,020, filed on Nov. 12, 1999.

(51) Int. Cl.[7] .................................................. B60C 11/24
(52) U.S. Cl. ...................... 362/500; 152/523; 152/154.2
(58) Field of Search ............................. 152/154.2, 523

(56) References Cited

U.S. PATENT DOCUMENTS 3,607,498 A * 9/1971 Kubota ........................ 152/523
3,729,041 A * 4/1973 Kubota ........................ 152/523
5,303,756 A * 4/1994 Hill ............................ 152/154.2
6,286,573 B1 * 9/2001 Hine ............................ 152/524

* cited by examiner

Primary Examiner—Alan Cariaso
Assistant Examiner—Ismael Negron
(74) Attorney, Agent, or Firm—Goldstein & Lavas, P.C.

(57) ABSTRACT

A safety tire with illumination including a tire adapted for operative positioning on a vehicle. The tire has a plurality of treads extending circumferentially around a perimeter thereof, and annular recesses between the treads. Fluorescently colored rubber is disposed within the annular recesses of the plurality of treads of the tire. Fluorescently colored steel belts of a contrasting color extend within the treads to indicate when the tire is unduly worn.

1 Claim, 3 Drawing Sheets

TIRE WITH FLUORESCENT TREAD AND TREAD WEAR INDICATORS

CROSS REFERENCES AND RELATED SUBJECT MATTER

This application relates to subject matter contained in patent application Ser. No. 09/591,415, filed in the United States Patent Office on Jun. 10, 2000, and provisional patent application Ser. No. 60/165,020, filed in the United States Patent & Trademark Office on Nov. 12, 1999.

BACKGROUND OF THE INVENTION

The present invention relates to a safety tire with illumination and more particularly pertains to allowing a tire to illuminate at night to prevent accidents, and to illuminate in a distinct tire to indicate undue tread wear.

The visibility of a vehicle is a major factor in accident avoidance. Any steps which seek to make a vehicle more visible are generally preferred and are implemented by automobile manufacturers. Vehicle visibility can be especially important when attempting to recover vehicles who have left the road in rural areas.

The use of illuminating objects is known in the prior art. More specifically, illuminating objects heretofore devised and utilized for the purpose of allowing objects to be seen in the dark are known to consist basically of familiar, expected and obvious structural configurations, notwithstanding the myriad of designs encompassed by the crowded prior art which have been developed for the fulfillment of countless objectives and requirements.

Japanese Patent No. 8-318715 discloses a tire which can have a multiple color scheme, to enhance the visual appearance of the tire. The color scheme can be provided by using fluorescent paint in the grooves of the tire.

However, tire treads play an important role in maintaining frictional contact with the road surface, even during adverse weather condition. However, when tire treads wear, traction can be severely impacted. Unfortunately, undue tire wear is not readily apparent without a close inspection. Thus, most automobile owners do not realize that their tires are worn until they have difficulty maintaining control of their vehicle.

Certain devices have been proposed which seek to indicate tire wear to the driver. While these devices fulfill their respective, particular objective and requirements, these patents do not describe a safety tire with illumination for allowing a tire to illuminate at night to prevent accidents.

In this respect, the safety tire with illumination according to the present invention substantially departs from the conventional concepts and designs of the prior art, and in doing so provides an apparatus primarily developed for the purpose of allowing a tire to illuminate at night to prevent accidents, make the vehicle more visible even during the daytime, and indicate to a user when tire wear mandates immediate tire replacement.

Therefore, it can be appreciated that there exists a continuing need for a new and improved safety tire with illumination, which can be used for allowing a tire to illuminate at night to prevent accidents. In this regard, the present invention substantially fulfills this need.

SUMMARY OF THE INVENTION

In the view of the foregoing disadvantages inherent in the known types of illuminating objects now present in the prior art, the present invention provides an improved safety tire with illumination. As such, the general purpose of the present invention, which will be described subsequently in greater detail, is to provide a new and improved safety tire with illumination and method which has all the advantages of the prior art and none of the disadvantages.

To attain this, the present invention essentially comprises a tire adapted for operative positioning on a vehicle. The tire has a plurality of treads extending circumferentially around a perimeter thereof, and a plurality of annular recesses therebetween. Fluorescently colored rubber of a first color are disposed within the annular recesses of the plurality of treads of the tire. Steel belts extend within the treads which are fluorescently colored of a second color so that when the tires wear the second color is exposed to indicate undue wear. There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved safety tire with illumination, which has all the advantages of the prior art illuminating objects and none of the disadvantages.

It is another object of the present invention to provide a new and improved safety tire with illumination, which may be easily and efficiently manufactured and marketed.

It is a further object of the present invention to provide a new and improved safety tire with illumination, which is of durable and reliable construction.

An even further object of the present invention is to provide a new and improved safety tire with illumination which is susceptible of a low cost of manufacture with regard to both materials and labor, and which accordingly is then susceptible of low prices of sale to the consuming public, thereby making such safety tire with illumination economically available to the buying public.

Even still another object of the present invention is to provide a new and improved safety tire with illumination for allowing a tire to illuminate at night and be more visible during the day to prevent accidents.

It is yet a further object of the present invention to provide a new and improved safety tire which illuminates in a second color when the tire has experienced undue tread wear. Accordingly, an unsafe tire is readily apparent to the driver and to others who can inform the driver thereabout.

Lastly, it is an object of the present invention to provide a new and improved safety tire with illumination including a tire adapted for operative positioning on a vehicle. The tire has a plurality of treads extending circumferentially around a perimeter thereof and annular recesses therebetween. A fluorescently colored rubber is disposed within the annular recesses of the plurality of treads of the tire in a first color. Steel belts of a second color are located within the treads, which are exposed once the tire has experienced undue wear.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various figures.

DESCRIPTION OF THE PREFERRED EMBODIMENT

Figure 2:
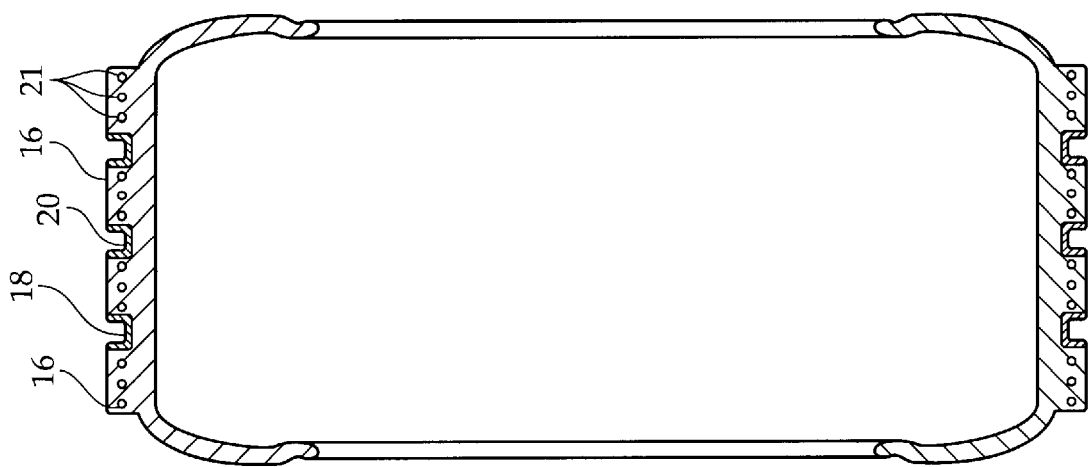
FIG. 2 is a cross-sectional view of the present invention following manufacture.
Figure 1:
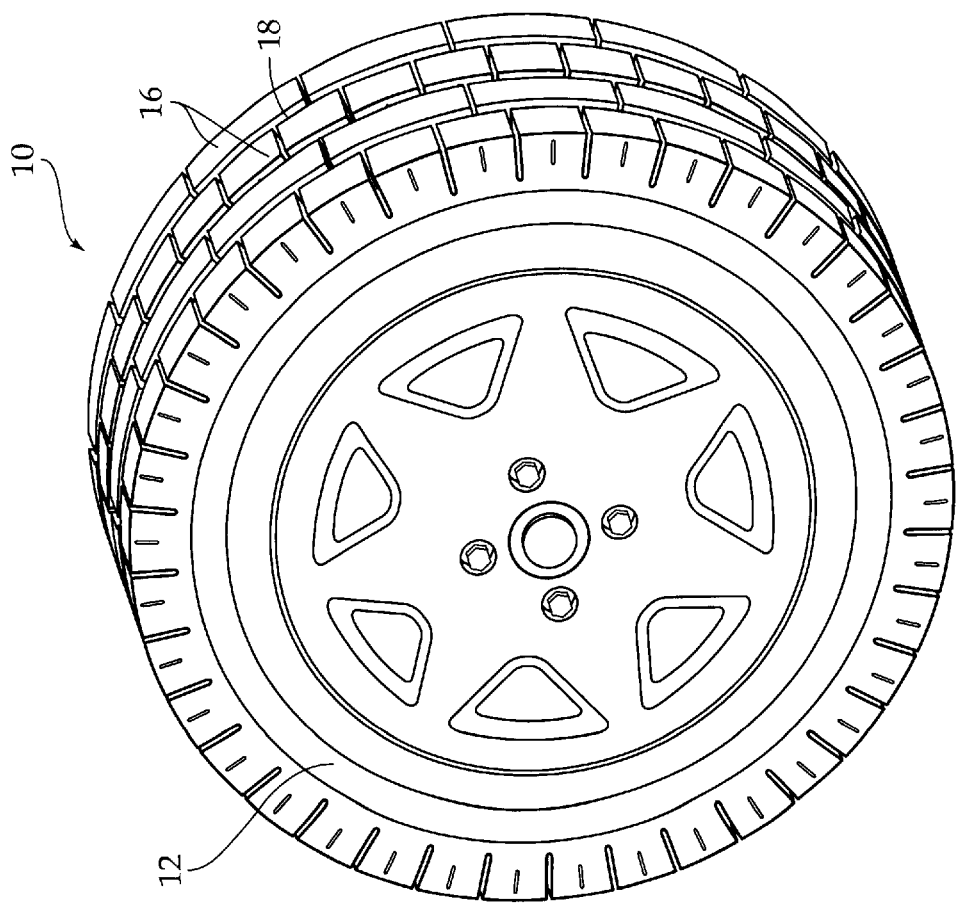
FIG. 1 is a perspective view of the preferred embodiment of the safety tire with illumination constructed in accordance with the principles of the present invention.
Figure 3:
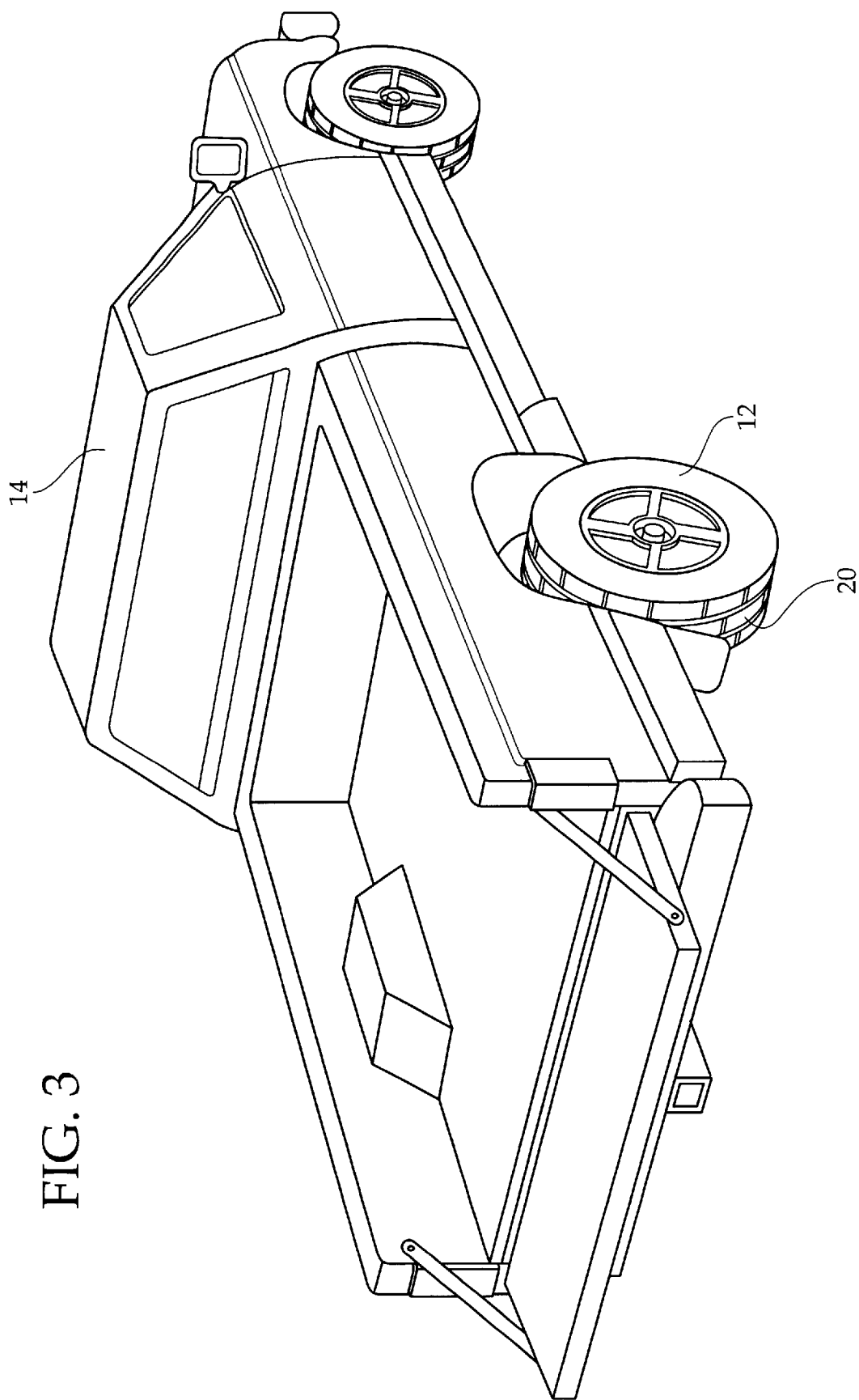
FIG. 3 is a perspective view of the present invention mounted in place on a vehicle.

With reference now to the drawings, and in particular, to FIGS. 1 through 4 thereof, the preferred embodiment of the new and improved safety tire with illumination embodying the principles and concepts of the present invention and generally designated by the reference number 10 will be described. Specifically, it will be noted in the various Figures that the device relates to a safety tire with illumination for allowing a tire to illuminate at night to prevent accidents. In its broadest context, the device consists of a tire, fluorescently colored rubber in a first color, and fluorescently colored steel belts in a second color. Such components are individually configured and correlated with respect to each other so as to attain the desired objective.

The tire is adapted for operative positioning on a vehicle 14. The tire 12 has a center which is also a rotational axis of the tire and a perimeter. The tire has a plurality of treads 16 extending circumferentially around the perimeter thereof, and a protruding radially outward at a generally consistent radial distance from the center. Annular recesses 18 extend between the treads 16 and define valleys a set radial distance from the rotational axis of the tire.

Fluorescently colored rubber 20 is disposed within the annular recesses 18 of the plurality of treads 16 of the tire 12. The fluorescently colored rubber 20 is of a first color. In use, the fluorescently colored rubber 20 allows for other drivers to see the vehicle incorporating the present invention. In particular, the light emanating or reflecting from the fluorescently colored rubber 20 is especially visible when the vehicle is advancing toward the viewer. This will help to prevent accidents. The fluorescently colored rubber 20 also provides increased visibility for the tire 12 and thus the vehicle 14 incorporating the tire 12 during daylight hours.

Figure 4:
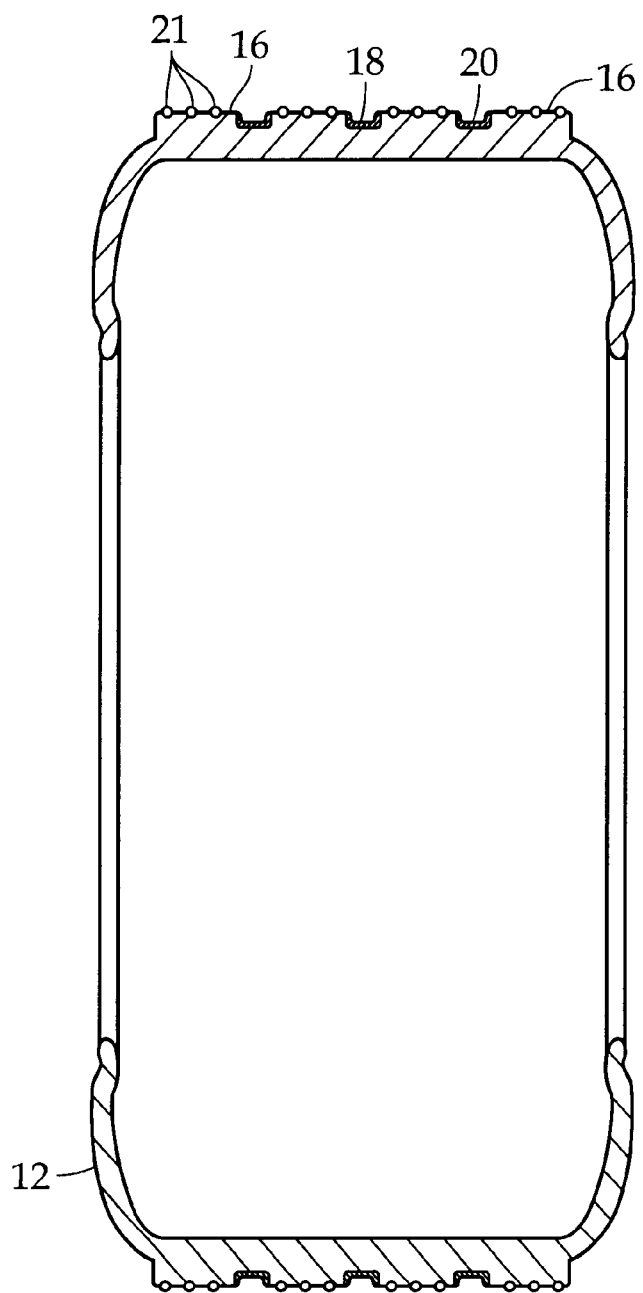
FIG. 4 is a cross-sectional view of the present invention, similar to FIG. 3, except following use, wherein excessive wear has exposed the steel belts which are fluorescently painted.

Further in accordance with the present invention, steel belts 21 extend circumferentially around the tire within the treads 16. The steel belts 21 extend at a fixed radial distance which is slightly greater than the annular recesses 18 between the treads 16. Accordingly, as the tire wears, the steel belts 21 will become exposed, as seen in FIG. 4. Thus, according to the present invention, the steel belts 21 are colored a second fluorescent color. Therefore, when the tire wears and the steel belts 21 become exposed, the second fluorescent color becomes visible in contrast to the first fluorescent color. The presence of the second fluorescent color indicates to the driver, other drivers, and others that the tire 12 is dangerously worn, and must be replaced. As previously stated, the steel belts 21 extend at a radial distance from the rotational axis at the center which is greater than valleys formed by the annular recesses 18, so that the steel belts 21 are exposed before the treads wear to the level of the annular recesses 18.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

In particular, it should be noted that "steel" belts is a familiar term within the tire industry. However, no particular metal or alloy is intended for the present invention. In addition, "rubber" may be readily substituted with equivalent synthetic rubber products.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A vehicle tire comprising:

a plurality of treads extending circumferentially around a perimeter of said tire, the treads being separated by annular recesses, each one of such recesses forming a valley a set radial distance from a rotational axis of the tire;

fluorescently colored rubber disposed within the annular recesses of the plurality of treads of the tire, the fluorescently colored rubber of a first fluorescent color;

steel belts extending circumferentially within the treads at a greater radial distance than the valleys from said rotational axis, the steel belts of a second fluorescent color; and the steel belts being exposed with the second fluorescent color abundantly visible, after the tread has worn significantly.

* * * * *